Figure 1:
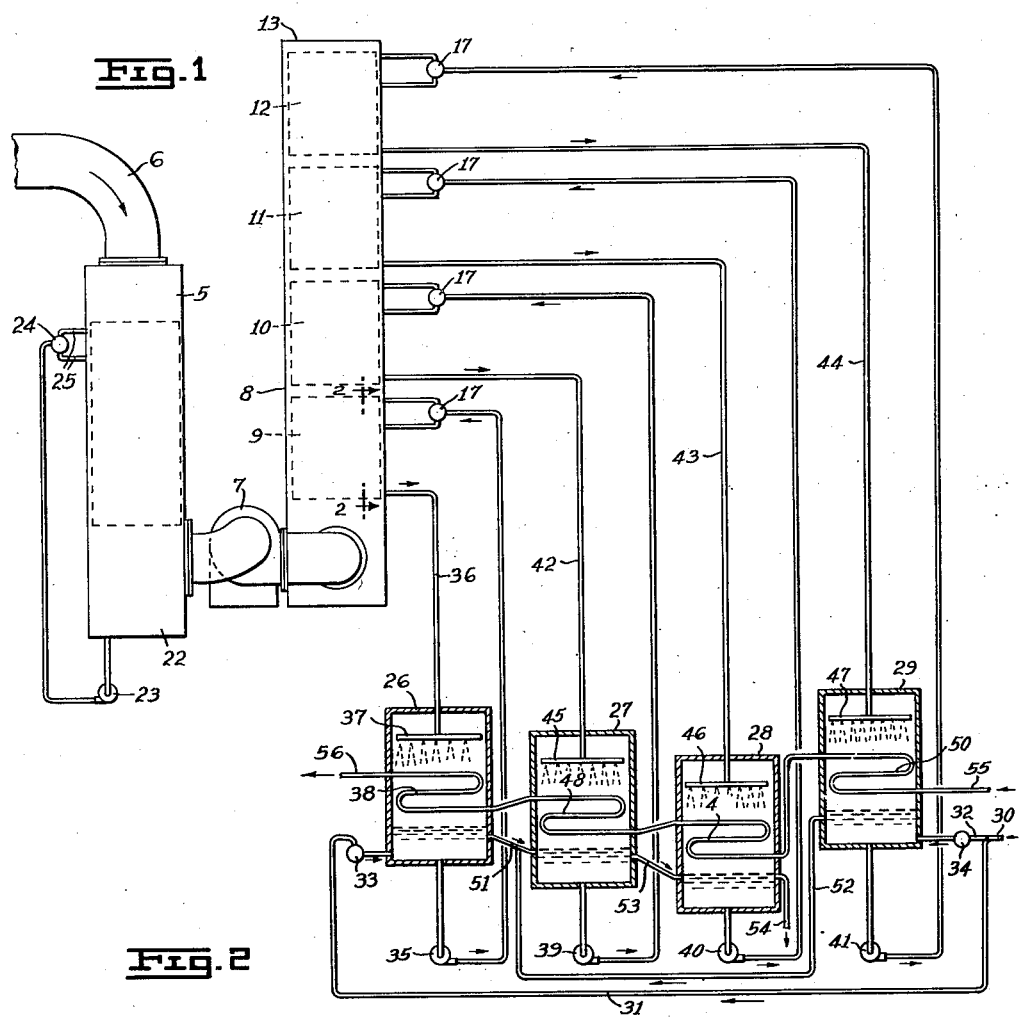

Oct. 30, 1951  A. S. RICHARDSON  2,573,491
AIR-COOLING APPARATUS
Filed May 14, 1947

INVENTOR
Allan S. Richardson
BY
Pennie, Edmonds, Morton and Barrows
ATTORNEYS

Patented Oct. 30, 1951

2,573,491

UNITED STATES PATENT OFFICE 2,573,491

AIR-COOLING APPARATUS

Allan S. Richardson, Butte, Mont.

Application May 14, 1947, Serial No. 748,020

2 Claims. (Cl. 261—22)

This invention relates to cooling air, and is particularly concerned with the provision of improved apparatus well adapted for cooling the air in mines. This application is a continuation-in-part of my prior applications Serial No. 527,125, filed March 18, 1944, now Patent No. 2,479,408, and Serial No. 651,991, filed March 5, 1946, now Patent No. 2,525,045.

The apparatus of the present invention is designed primarily for use in cooling warm, humid air by means of a hygroscopic liquid, advantageously by the method described and claimed in my above-mentioned Patent No. 2,479,408. This method comprises absorbing water vapor from the air by a hygroscopic liquid, with resulting heating of the liquid. Heat is then transferred from the liquid by flowing a cooling medium such as water in heat-exchange relation therewith. The heat absorbed by the cooling medium is dissipated to the outdoor atmosphere. The hygroscopic liquid, which becomes diluted with water during the course of its contact with the humid air, is regenerated by a concentration process of any suitable character. Any desired hygroscopic liquid may be used in carrying out this method, such as aqueous solutions of calcium, zinc or lithium chlorides, or a solution of diethylene glycol, or the like.

A feature of the method described in my said Patent No. 2,479,408 is that the humid air is pased through a series of contactors, in each of which it is brought in contact with a body of the hygroscopic liquid, resulting in heating of the liquid. The heated hygroscopic liquid is delivered to each contactor from a suitable cooler, and is returned from the contactor to the same cooler from which it was withdrawn. The first and last contactors in the series are supplied with fresh concentrated hygroscopic liquid, while more dilute hygroscopic liquid is employed in the intermediate contactors in the series.

The improved apparatus provided by the present invention for carrying out the above-described air cooling method comprises a single vertical chamber within which is located a series of contactors, arranged in vertically spaced relation, for bringing the air to be cooled into contact with the several bodies of hygroscopic liquid. The contactors each preferably comprise a series of horizontally spaced sinuous sheets, providing sinuous gas passages therebetween. Means are provided for delivering hygroscopic liquid to the upper portion of each sheet of each contactor, and means are provided for cooling the hygroscopic liquid as it drains from each sheet, and for preventing such liquid from falling to the sheets of the contactor next below.

A vertical contactor chamber of the character provided by the invention provides a substantially straight-line path of flow for the air passing from one contactor to the next in the series. It enables the apparatus to be built very compactly, with a minimum of duct work, while securing the advantages of sinuous sheets, down which films of hygroscopic liquid flow, for bringing the air into contact with the hygroscopic liquid.

Figure 2:
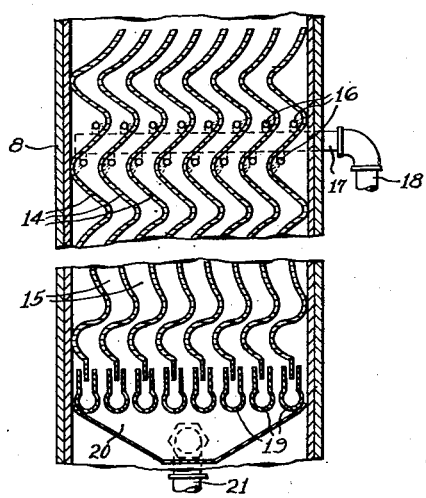

An advantageous embodiment of the new apparatus is described below with reference to the accompanying drawings, in which Fig. 1 shows a contactor chamber constructed in accordance with the invention, with associated equipment, and Fig. 2 shows a cross section through the contactor chamber, taken substantially along the line 2—2 of Fig. 1.

The apparatus shown in Fig. 1 comprises an air-washing tower 5, to the top of which air is delivered through a suitable duct 6. A fan or blower 7 draws air through the washing tower 5 and delivers it to the base of a contactor chamber 8. The air passes upwardly through this chamber and through a vertically spaced series of contactors 9, 10, 11 and 12, in each of which it is brought in contact with hygroscopic liquid. The top 13 of the contactor chamber may be open for direct delivery of the cooled air to the space in which the apparatus is located, or suitable air ducts may be connected thereto to carry the air to the region where it is desired.

The construction of the individual contactors 9, 10, 11 and 12, as shown in Fig. 2, is substantially the same as shown and described in my aforementioned Patent No. 2,525,045. Each contactor comprises a plurality of horizontally spaced sinuous sheets 14, which provide sinuous gas passages 15 therebetween. The sheets extend from one side wall to the other of the contactor chamber 8, and are supported thereby. Hygroscopic liquid is delivered to each side of each sheet by a series of spray pipes 16, which extend the width of the sheets. The spray pipes are connected to a header 17 to which the hygroscopic liquid is delivered by an inlet pipe 18.

The hygroscopic liquid flows as a film down each surface of each sheet, and drains from the bottoms of the sheets into collecting troughs 19, one of which is arranged at the bottom of each sheet to catch the hygroscopic liquid as it drips from the sheets. The troughs drain into a collecting header 20 located at the sides of the contactor chamber, and the hygroscopic liquid is withdrawn therefrom through a discharge pipe 21. The troughs, in addition to serving as collecting vessels for the hygroscopic liquid, effectively prevent the hygroscopic liquid draining from one contactor from falling on to the plates of the contactor next below and mixing with the hygroscopic liquid flowing therethrough. Additionally the troughs act as shields for the inlet or bottom edges of the contactor sheets and prevent dilute hygroscopic solution which drips from the bottom edges of the sheets from being picked up in the high velocity stream of air passing through the contactors and carried upwardly into the contactors where it would serve to dilute the hygroscopic solution on the upper portions of the sheets. Such dilution of the hygroscopic solution would tend to substantially lessen the efficiency of the apparatus.

Air passing upwardly through the contactor chamber flows between the troughs 19 and thence upwardly through the sinuous gas passages 15. The frequent and sharp reversals in the direction of gas flow imposed by the sinuous sheets brings the air into intimate contact with the downwardly flowing films of hygroscopic liquid and insures efficient transfer of water vapor from the humid air to the hygroscopic liquid.

The washing tower 5 advantageously contains a plurality of sinuous sheets similar to those shown in Fig. 2, for effecting efficient contact of the incoming air with the wash water. In the case of the washing tower, the collecting troughs 19 may be omitted, and the wash water draining from the bottom of the sheets may collect in a sump 22 at the base of the tower. The wash water may be recycled by a pump 23 from a sump 22 to a manifold 24 and spray pipes 25, by which it is again delivered to the sinous sheets near the tops thereof.

The sinuous sheets employed in the wash tower and also in the contactors advantageously have the form described in my Patent No. 2,231,088, granted February 11, 1941. Sinuous sheets as therein described are configured to provide a series of Venturi-like passages which cause the air to expand and contract alternately as it flows upwardly between the sheets. This results in a turbulent flow which eliminates any tendency of the air to follow a path that does not give adequate opportunity for it to impinge against the film of liquid water (or hygroscopic liquid) flowing downwardly along the surfaces of the sheets.

Each contactor 9, 10, 11 and 12 has a cooler 26, 27, 28 and 29, respectively, associated with it. The hygroscopic liquid is pumped from the cooler to its associated contactor, and is returned from the contactor to the same cooler. The coolers serve to cool the hygroscopic liquid, which becomes heated in the course of absorbing moisture from the humid air with which it is brought in contact in the contactors.

The flow of hygroscopic liquid through the coolers and contactors, and from cooler to cooler, and the flow of cooling water through the coolers, as shown in Fig. 1 of the drawings, is substantially the same as described and claimed in my said Patent No. 2,479,408. Concentrated hygroscopic liquid is delivered to the first and last coolers 26 and 29 in the series through an inlet pipe 30, branch pipes 31 and 32 and valves 33 and 34. The valves control the proportion and amount of hygroscopic liquid that enters the first and last coolers. Hygroscopic liquid is pumped by a pump 35 from the bottom of the first cooler 26 to the inlet manifold 17 of the first contactor 9. In the contactor, the hygroscopic liquid is both heated and diluted as a result of absorbing moisture from the warm, humid air passing in contact with it. This warmed and somewhat diluted hygroscopic liquid is returned through piping 36 to a spray head 37 in the upper portion of the first cooler 26. The liquid is sprayed into heat-exchange contact with cooling coils 38, whereby it is cooled for reuse, and it then falls again to the bottom of the cooler and is in part recycled by the pump 35 back to the first contactor 9.

In much the same way, hygroscopic liquid in the coolers 27, 28 and 29 is circulated by pumps 39, 40 and 41 to the inlet manifolds 17 supplying the second, third and fourth contactors 10, 11 and 12, respectively, and is returned from these respective contactors through piping 42, 43 and 44 to the coolers from which the solution was pumped. As in the first cooler, the returned solution is sprayed by spray heads 45, 46 and 47 over cooling coils 48, 49 and 50, to cool the solution preparatory to being recycled.

If the hygroscopic liquid is circulated in a completely closed circuit between each cooler and its associated contactor, the liquid would soon become too diluted for effective removal of any further moisture from the humid air flowing through the contactor chamber. Accordingly, a small portion of the hygroscopic liquid is continually withdrawn from the first cooler 37 through piping 51, and from the last cooler 29 through piping 52, to the second cooler 27 in the series. An equivalent amount of solution is continuously withdrawn from the second cooler 27 through a connecting pipe 53 to the third cooler 28. From this next to last cooler in the series, hygroscopic liquid is continuously withdrawn through a pipe 54 to a concentrator (not shown) wherein excess water is removed, and the concentrated solution is redelivered to the system through the pipe 30. Thus the first and last coolers and their associated contactors are supplied with fresh concentrated hygroscopic liquid, and the second, third, etc., coolers in the series are supplied with progressively more dilute hygroscopic liquid.

The cooling water with which the cooling coils 38, 48, 49 and 50 are supplied enters through a cooling water supply pipe 55 and flows serially through the coolers from the last to the first. The spent cooling water from the first cooler 26 is conveyed by a pipe 56 to a cooling tower, in which it is recooled for reintroduction into the system through the inlet pipe 55, or is discarded to waste, depending on which procedure is most economical.

In the system just described for circulation of the cooling water and the hygroscopic liquid, the cooling water is near its maximum temperature in the first cooler 26. On the other hand, this cooler is supplied with concentrated hygroscopic liquid, which is best able to absorb moisture from the air passing through the contactor chamber 8, and which in consequence becomes heated to a higher temperature than would a more dilute hygroscopic liquid. The partially spent cooling water entering the cooling coil 38 of the first cooler is thereby able to absorb still more heat from the relatively warm hygroscopic liquid sprayed therein. Passing successively to the second, third, etc., coolers, the hygroscopic liquid becomes progressively more dilute, and hence progressively less able to absorb moisture from the air passing through the contactor chamber; but, on the other hand, the cooling water flowing countercurrently to the hygroscopic liquid serves to keep the most dilute hygroscopic liquid at a lower temperature than the more concentrated hygroscopic liquid in the coolers that precede in the series. Because of the relatively lower temperature of the more dilute hygroscopic liquid, the extent to which it loses ability to absorb moisture on account of its dilution is in part offset by its increased ability to absorb moisture owing to its lower temperature.

The last cooler 29 in the series is supplied with concentrated hygroscopic liquid and with incoming fresh cooling water (which is at its lowest temperature in this cooler). Consequently, the hygroscopic liquid from the last cooler 29 in the series is enabled to reduce the moisture content of the air passing through the last contactor 12 in the contactor chamber 8 to a desirably low value.

In my said Patent No. 2,525,045, I have described a method for cooling air which involves alternately humidifying the air by passage in contact with water and dehumidifying it by passage in contact with a hygroscopic liquid. The apparatus herein described may be adapted to use in conjunction with that method. The physical construction of the contactor chamber 8 and of the contactors 9, 10, 11, etc., therein need not be altered to adapt the apparatus to the method of said Patent No. 2,525,045; but in such case only alternate contactors (say contactors 10, 12, etc.) will be supplied with hygroscopic liquid for the purpose of dehumidifying the air passing therethrough. The intervening contactors (say contactors 9, 11, etc.) will be supplied with water for humidifying the air preparatory to each dehumidification step. When the apparatus is adapted to the method involving alternate humidification and dehumidification, a greater number of contactors within the contactor chamber may be required than when no provision is made to humidify the air before each dehumidification treatment.

The method described in my said Patent No. 2,525,045, involving alternate humidification and dehumidification of the air has the advantage that the hygroscopic liquid can be heated to a maximum value, and hence a minimum of cooling water is required. The procedure described in detail herein and in my said Patent No. 2,479,408, which does not involve humidification prior to each dehumidification step, requires more cooling water, but is more economical in the amount of hygroscopic liquid required. In either case, however, the apparatus provided by the present invention permits construction of a simpler and more compact air treatment plant than is possible with apparatus of the character heretofore known. The vertical contactor chamber permits the individual contactors to be mounted more closely together than is possible in any other sort of apparatus, and provides for substantially straight-line flow of the air from contactor to contactor. The compact arrangement of the new apparatus requires a minimum of floor space, and is particularly well suited for installation in underground mines where space is limited.

I claim:

1. In apparatus of the character described for cooling warm humid air, a vertical contactor chamber, a plurality of contactors arranged vertically one above the other in said chamber, each contactor comprising a series of horizontally spaced sinuous sheets providing sinuous gas passages therebetween, means for delivering hygroscopic liquid to both sides of each sheet of each contactor adjacent the tops of said sheets, means for blowing a current of air upwardly through the chamber between the sheets of each contactor, and a shield for the inlet or bottom edge of each sheet of each contactor, said shield comprising a trough directly below the inlet or bottom edge of each sinuous sheet and parallel thereto for collecting hygroscopic liquid as it drains from the inlet or bottom edge thereof, each such trough having vertical side walls which extend to above the inlet or bottom edge of the adjacent sheet in closely spaced relation with the side surfaces thereof, whereby liquid draining from the inlet or bottom edge of each sheet into the trough is protected by said walls from becoming entrained in a current of air blown upwardly between said sheets from below the bottom thereof.

2. Apparatus of the character described comprising a vertical contactor chamber, at least three contactors arranged vertically one above the other in said chamber, each contactor comprising a series of horizontally spaced sinuous sheets providing sinuous gas passages therebetween, means for blowing a current of air upwardly through the contactors between the sheets thereof, a plurality of bodies of hygroscopic liquid of different concentrations, means for delivering liquid from the most concentrated body thereof to the upper portion of each sheet of both the uppermost and lowermost contactors and for delivering liquid from the less concentrated bodies thereof to the upper portions of the sheets of the intermediate contactors, a shield for the inlet or bottom edge of each sheet of each contactor, said shield comprising a trough directly below the inlet or bottom edge of each sinuous sheet in each contactor for collecting the liquid as it drains therefrom, each such trough having side walls which extend vertically to above the inlet or bottom edge of the adjacent sheet in closely spaced relation with the side surfaces thereof, whereby liquid dripping from the inlet or bottom edge of each sheet into the trough is protected by said side walls from becoming entrained in a current of air blown upwardly between said sheets from below the bottom thereof, and means for returning liquid collecting in said troughs to the body thereof whence it came.

ALLAN S. RICHARDSON.

REFERENCES CITED

The following references are of record in the file of this patent:

UNITED STATES PATENTS

| Number | Name | Date |
|---|---|---|
| 2,062,771 | Stead | Dec. 1, 1936 |
| 2,220,219 | Crawford | Nov. 5, 1940 |
| 2,231,088 | Richardson | Feb. 11, 1941 |
| 2,235,322 | Martin | Mar. 18, 1941 |
| 2,251,649 | Wichmann | Aug. 5, 1941 |